(12) United States Patent
Dickerman

(10) Patent No.: US 11,953,412 B2
(45) Date of Patent: Apr. 9, 2024

(54) QUADRATURE PHASE ANALYSIS LIGHT SCATTERING FOR ELECTROPHORESIS AND ZETA POTENTIAL MEASUREMENTS

(71) Applicant: Robert Dickerman, Northfield, MA (US)

(72) Inventor: Robert Dickerman, Northfield, MA (US)

(*) Notice: Subject to any disclaimer, the term of this patent is extended or adjusted under 35 U.S.C. 154(b) by 188 days.

(21) Appl. No.: 17/807,256

(22) Filed: Jun. 16, 2022

(65) Prior Publication Data

US 2022/0307962 A1     Sep. 29, 2022

(51) Int. Cl.
| | |
|---|---|
| *G01N 15/0205* | (2024.01) |
| *G01N 15/00* | (2024.01) |
| *G01N 15/10* | (2024.01) |
| *G01N 15/1429* | (2024.01) |
| *G01N 15/1434* | (2024.01) |

(52) U.S. Cl.
CPC ..... *G01N 15/0211* (2013.01); *G01N 15/1429* (2013.01); *G01N 2015/0003* (2013.01); *G01N 2015/03* (2013.01); *G01N 2015/1027* (2024.01); *G01N 2015/1454* (2013.01)

(58) Field of Classification Search
CPC .......... G01N 15/0211; G01N 15/1429; G01N 2015/0003; G01N 2015/1075; G01N 2015/1027; G01N 2015/1454; G01B 9/02079; G01B 2290/45; G01B 2290/70
See application file for complete search history.

(56) References Cited

U.S. PATENT DOCUMENTS

| | | | | |
|---|---|---|---|---|
| 6,020,963 A | * | 2/2000 | DiMarzio | .......... G01N 21/4795 356/491 |
| 8,525,991 B2 | * | 9/2013 | Hsieh | ..................... C08K 5/523 356/450 |

(Continued)

FOREIGN PATENT DOCUMENTS

EP     2735870 B1     5/2014

OTHER PUBLICATIONS

John F. Miller, The Determination of Very Small Electrophoretic Mobilities in Polar and Nonpolar Colloidal Dispersions Using Phase Analysis Light Scattering, Journal of Colloid and Interface Science, vol. 143, No. 2, May 1991, pp. 532-554, Elsevier, Amsterdam, Netherlands.

*Primary Examiner* — Michael A Lyons

(57) ABSTRACT

Stationary devices employing quadrature phase analysis light scattering are provided, to aid in the determination of the magnitude and polarity of electrophoretic mobility and zeta potential of particles in colloids. The devices use an optical quadrature interferometer with an electrophoresis sample chamber containing sample particles undergoing electrophoresis, the optical quadrature interferometer being configured to generate a quadrature signal. The phase of the quadrature signal may be analyzed at the frequency of the sample chamber electric field to estimate displacements and directions of the particles. The estimates can be used to determine a central value of the magnitude of the electrophoretic mobility, as well as its polarity. Particles having low electrophoretic mobility, or that may be adversely affected by high electric fields, can be analyzed, and constraints on vibration and light source coherence length may be relaxed. A phase modulator or frequency shifter is not required.

18 Claims, 4 Drawing Sheets

(56) References Cited

U.S. PATENT DOCUMENTS

| | | | |
|---|---|---|---|
| 10,601,630 B1* | 3/2020 | Dickerman | ......... H04L 27/3809 |
| 10,690,625 B2 | 6/2020 | Miller | |
| 11,181,503 B1 | 11/2021 | Dickerman | |
| 2006/0114467 A1* | 6/2006 | Nicoli | .................... G01N 21/51 |
| | | | 356/450 |
| 2014/0144780 A1* | 5/2014 | Noack | ............. G01N 27/44721 |
| | | | 204/549 |

\* cited by examiner

113 — Sample Holder
112 Electrophoresis Sample Chamber

QUADRATURE PHASE ANALYSIS LIGHT SCATTERING FOR ELECTROPHORESIS AND ZETA POTENTIAL MEASUREMENTS

REFERENCE TO RELATED PATENTS

This application references U.S. Pat. No. 11,181,503 B2; it discloses a novel combination of the mechanical and optical hardware aspects of U.S. Pat. No. 11,181,503 B2 with different sample cell electrode signals and different quadrature signal analysis.

FIELD AND BACKGROUND OF THE INVENTION

The present disclosure relates to electrophoresis instruments that use optics and electronics to assist in determining the displacements and directions of displacement of particles undergoing electrophoresis. Such displacement and direction of displacement information may be used, together with other information, to determine the magnitudes and polarities of the electrophoretic mobility and zeta potential of particles.

Dispersions and suspensions of particles in fluids or gels are called colloids. A wide range of products constitute colloids, including many pharmaceuticals, food products, paints, and industrial materials, for example. A colloid's stability may be strongly dependent on the electrophoretic mobility and zeta potential of its particles, which, in turn, are related to the particles' electrostatic charges. This dependence may be used to advantage. For example, the propensity of particles to aggregate by coagulation, creaming, or sedimentation (perhaps thereby reducing shelf life), may be reduced if the magnitude of the electrophoretic mobility and zeta potential of the particles is increased. Conversely, in water treatment, for example, the dosage of flocculants (used to deliberately aggregate contaminant particles to ease filtering operations) may be optimized if the zeta potential of the particles is known. The electrophoretic mobility and zeta potential of particles may be manipulated by changing the pH, conductivity, or formulation concentration of a colloid. Electrophoresis may also be used to separate particles or macromolecules of different sizes or charges in a colloid or gel, as in DNA and RNA analysis; knowledge of the electrophoretic mobility and zeta potential of the particles may be useful for this process.

Electrophoresis is the movement of charged particles in a fluid or gel under the influence of an electric field. In a zeta potential or electrophoresis instrument an optical interferometer may be used to perform Doppler velocimetry by mixing a reference beam with light from a main beam that has been scattered by particles suspended in a electrophoresis sample chamber, whilst the particles are subjected to a known electric field. Populations of particles with similar zeta potential undergoing electrophoresis will be compelled by the field to drift generally in the same direction and with similar speed (except that speed profiles are affected by sample chamber electroosmosis and Brownian motion, as is well known). Field polarity may be cyclically reversed. The speed of the particles may be proportional to the strength of the applied field and the magnitude of the charge of the particles. The motion of the particles causes a Doppler shift in the frequency of the scattered light, with respect to the frequency of the reference beam light. When the light of the reference beam and the scattered light are recombined, the Doppler shift in the frequency of the scattered light may be manifested as a beat frequency in the envelope of the electric field of the combined light waves, i.e., a beat frequency in the recombined light intensity. This beat frequency is proportional to particle speed. In some applications, efficient interference between light in a reference beam and low-angle scattered light from a main beam is possible because the polarization of forward scattered main beam light is substantially unchanged from that of the main beam for angles less than approximately 30°. A photodetector may be used to detect the envelope of light intensity and the beat frequency.

If a power spectral density function is computed for the photodetector signal, the Doppler shift or beat frequency will be manifested as a non-zero sample or peak in the power spectrum at the beat frequency, with the peak width depending, at least, on particle size and the spread of zeta potential. The beat frequency may be substantially proportional to the strength of the applied electric field, as well as to the magnitude of the zeta potential of the particles, and is also dependent on the specific optical geometry of any implementation. However, if the geometry of the optical system is known, and if parameters such as the frequency of the light source are known, the frequency of a spectral peak may be used to calculate a corresponding particle speed v, in a conventional manner. If the applied electric field strength E is also known, electrophoretic mobility $\mu_e$ may be calculated as $$\mu_e = \frac{v}{E}$$

If other information such as the viscosity and the dielectric constant of the fluid are also known, the electrophoretic mobility $\mu_e$ may be used to calculate the magnitude of zeta potential, for example, in a conventional manner.

The interferometer just described may be categorized as a homodyne interferometer, because, apart from Doppler shifts, only one light frequency is nominally used in the instrument.

Brownian motion of the particles broadens any observed beat frequency peaks. Smaller particles cause wider peaks, and, in addition to measuring electrophoretic mobility and zeta potential, many light scattering instruments analyze the broadened peaks to estimate size distributions for sample particles. Correlation functions, Fourier transforms, and power spectral density functions of the photodetector signal are commonly used for analysis.

The direction of motion of any given population of particles under study may be characterized as being either positive or negative, corresponding to particle motion in either the same or the opposite direction of the applied electric field; this direction will depend on the sign of the electrophoretic mobility of the particles. However, conventional electrophoresis or zeta potential instruments that employ homodyne interferometer velocimeters may be plagued by an inability to determine the directions of particles. This deficiency is similarly to that of homodyne devices used to measure monolithic target displacement in the field of precision metrology.

To cure this deficiency, a translating optical component, such as a mirror or corner reflector, may be included in one optical path of the interferometer, to continuously lengthen or shorten that optical path's length in a known manner. This changing optical path length will cause a known baseline frequency shift in the detector output signal that allows an unambiguous determination of the directions of the particles. This is because the Doppler shift caused by a particle's motion will add or subtract, respectively, from the baseline beat frequency between the unmodified light source frequency and the shifted frequency, depending on whether the sample particles drift in either the same or the opposite direction of the applied electric field, and have a velocity component directed towards, or away from, the optics that receive the scattered light. An oscillating mirror or Bragg cell may also be used to accomplish a similar known frequency shift. The apparatus used to cause a such a known frequency shift is called a phase modulator or frequency shifter. An interferometer that uses a phase modulator may be categorized as a heterodyne interferometer, because more than one source light frequency is nominally used in the instrument.

When the light source used is a laser, these methods of measuring particle speed and electrophoretic mobility, have been called laser Doppler velocimetry (LDV), and laser Doppler electrophoresis (LDE), respectively.

In 1990, an analysis method called Phase Analysis Light Scattering (PALS) was introduced by Miller that allowed the characterization of samples with low mobility, even at low applied electric field. This method is different from LDV and LDE, in part, because it does not estimate a spectrum of particle speeds, corresponding to a distribution of mobilities in a sample. Rather, it estimates a single central value for the electrophoretic mobility of a sample. Furthermore, although conventional PALS employs similar optics to that used for LDV and LDE, including a phase modulator or frequency shifter, it instead measures the phase shift, rather than the frequency shift, induced in the photodetector signal produced by interference between the light of the frequency-modulated reference beam and the scattered light, relative to an initial phase produced by a stationary scatterer. This phase shift is nominally proportional to the displacement of the charged scatterers caused by the applied electric field. Measurements are typically made using sine wave alternating electric fields.

A disadvantage of any instrument using a phase modulator or frequency shifter is that any deviations from ideal operation of the phase modulator or frequency shifter lead to measurement errors. In 2015, EP 2735870131, assigned to Anton Paar GmbH, addressed some of these errors by adding even more optics and electronics to monitor the phase modulator or frequency shifter.

In 2021, U.S. Pat. No. 11,181,503 B2 eliminated the phase modulator or frequency shifter and its associated errors from the electrophoresis instrument. It disclosed stationary devices for performing laser Doppler velocimetry (LDV) and laser Doppler electrophoresis (LDE), that help to determine both magnitude and polarity of electrophoretic mobility. The devices employ a quadrature interferometer and spectral analysis to allow detection of both particle speed and direction, thereby eliminating the many disadvantages associated with a phase modulator or frequency shifter.

BRIEF DESCRIPTION OF DRAWINGS

Various apparatuses in accordance with the present disclosure will be described with reference to the drawings, in which.

Figure 1:
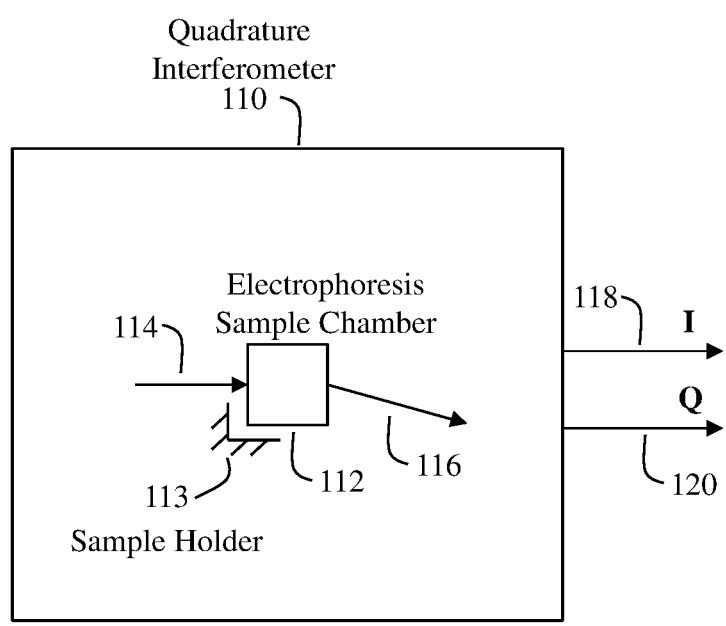
FIG. 1 shows a diagram of an apparatus of the present disclosure that may be used to aid the determination of polarity of electrophoretic mobility and zeta potential.

REFERENCE NUMERALS 110 quadrature interferometer
112 electrophoresis sample chamber
113 sample holder
114 main beam
116 scattered light
118 I signal
120 Q signal
122 positive electrode
124 particle
126 particle velocity vector
128 negative electrode
130 projection velocity component
132 rejection velocity component
210 analyzer
212 output
310 input block
312 function block
314 value block
316 output block

DETAILED DESCRIPTION

Conventional interferometers used for PALS, that determine the displacement, and direction of displacement, of particles in electrophoresis and zeta potential instruments may use frequency shifting subsystems with moving optical components. Such subsystems may increase the size, weight, complexity, fragility, and cost of such instruments, and constrain the choice of light sources; in addition, such subsystems may limit instrument resolution and introduce an additional source of measurement errors. The apparatuses of the present disclosure overcome these disadvantages with a novel method that may be called Quadrature Phase Analysis Light Scattering, or QPALS, that employs a quadrature interferometer together with appropriate signal processing.

QPALS comprises an extension of the instrumentation and methods disclosed in U.S. Pat. No. 11,181,503 B2. QPALS employs substantially the same mechanical hardware and optical chain but uses a wider variety of sample cell electric field waveforms, and different signal processing methods, from those disclosed in U.S. Pat. No. 11,181,503 B2. QPALS can provide measurements with sensitivity comparable to those of conventional PALS, without the use of a phase modulator or frequency shifter, as will be shown below.

The optical quadrature interferometer has an electrophoresis sample chamber. The electrophoresis sample chamber and the particles are positioned in a path of a main beam to produce a scattered light. The optical quadrature interferometer is configured to perform quadrature phase analysis light scattering on the particles by using the scattered light to generate a quadrature signal comprising characteristics related to the displacement and direction of displacement of the particles. The collective displacement and direction of displacement of the particles are determined, in part, by an alternating electric signal applied to electrodes of the sample chamber, and by the electrophoretic mobility of the particles. The quadrature signal is applied to a QPALS analyzer having signal processing means for acquiring a data record of the quadrature signal, evaluating a function of the data record, and determining a central value of the function substantially at the frequency of the alternating electric signal. The central value is used to determine an estimate of displacement and direction of displacement of the particles, thereby aiding the determination of magnitude and polarity of electrophoretic mobility and zeta potential of the particles.

As mentioned above, an optical quadrature interferometer used for QPALS can have substantially the same quadrature interferometer mechanical components and optical chain and photodetectors as were employed in any of the prior art LDV and LDE embodiments disclosed in U.S. Pat. No. 11,181,503 B2, for example, to generate the quadrature signal.

However, the waveform of the alternating electric field in the sample chamber, induced by the alternating electric signal applied to the electrodes, may be different for QPALS than for that employed in LDV and LDE. For example, in certain QPALS signal processing examples disclosed below, the field waveform is assumed to be sinusoidal, versus the substantially square wave typically used for LDV and LDE; however, in general, a square wave, or a triangle wave, or other arbitrary waveform could be used. In addition, the repetition rate of the electric field waveform can be much higher for QPALS than for LDV and LDE, because no frequency spectrum is determined, as it would be for each single half-cycle of the electric field in LDV and LDE; therefore, the frequency resolution constraint associated with the duration of half-cycle of the electric field is not pertinent in QPALS. In contrast, In QPALS, a central value is evaluated at substantially a single frequency, and the evaluating is performed over a plurality of cycles of the alternating electric signal. Consequently, the total experiment time over the plurality of cycles determines the extent to which a random error in the central value is mitigated. In terms of the type of measurement instrumentation that might be used (conceptually or in practice), a spectrum analyzer might be used for LDV and LDE, whereas a lock in amplifier might be used for QPALS.

Therefore, although the mechanical elements and optics and photodetectors disclosed in the prior art of U.S. Pat. No. 11,181,503 B2, for example, are used in QPALS embodiments, the nature of the resulting QPALS quadrature signal may be markedly different from that generated in the quadrature LDV and LDE of U.S. Pat. No. 11,181,503 B2, due to a different electric field waveform in the sample cell. Furthermore, the signal processing of that QPALS quadrature signal is markedly different in the present embodiments from that used in U.S. Pat. No. 11,181,503 B2, as will be explained below.

It should be noted that both the optical hardware and the signal processing used in QPALS embodiments are markedly different from those employed in conventional PALS. Unlike for conventional PALS, QPALS embodiments do not employ a phase modulator or frequency shifter, use at least two photodetectors to produce a I, Q quadrature signal, estimate the phase of the quadrature signal directly, and may detect a component of that estimated phase at the frequency of the alternating electric signal applied to the sample cell electrodes. In contrast, conventional PALS employs a phase modulator or frequency shifter, may use a single photodetector, and detects the phase of the photodetector signal with respect to the phase modulator or frequency shifter offset frequency.

The following more detailed description of the mechanical and optical hardware of the quadrature optical interferometer employed in the embodiments is substantially equivalent to that disclosed in U.S. Pat. No. 11,181,503 B2. However, the electric signal applied to the sample cell electrodes can be different, and the signal processing of the quadrature signal is different, from that disclosed in U.S. Pat. No. 11,181,503 B2, as was mentioned above, and is explained in more detail below.

FIG. 1 shows, in accordance with various apparatuses of the present disclosure, an optical quadrature interferometer 110 with a sample holder 113 loadable with an electrophoresis sample chamber 112. The quadrature interferometer 110 is employed to measure the aggregate displacement and direction of displacement of sample particles (not shown) contained by the electrophoresis sample chamber 112. The sample holder 113 positions the electrophoresis sample chamber 112 in a path of a main beam 114 from a coherent polarized light source (not shown) so that the sample particles are illuminated by the main beam 114. The coherent polarized light source may be a laser, for example, or another source that has a sufficient coherence length. The light source may also be constructed by placing a polarizer in the output path of a non-polarized light source. The sample particles scatter main beam 114 light to produce scattered light 116. The quadrature interferometer 110 may recombine Doppler-shifted scattered light 116 with un-shifted light from the light source. Due to interference, the intensity of the recombined light may depend upon the position of the sample particles and may fluctuate or beat as the particles are displaced or moved. In other words, a recombined light may have beat frequency variations in light intensity, and a recombined light that may have beat frequency variations in light intensity may be considered a light intensity beat signal. The quadrature interferometer 110 may select at least two different polarizations, that are separated by substantially 90°, of recombined light, thereby producing at least a first light intensity beat signal and a second light intensity beat signal that are in quadrature phase. The first and second light intensity beat signals may be named I, for In phase signal, and Q, for Quadrature phase signal, respectively. The I and Q signals may comprise constants, or sums of sinusoids, or sinusoids with some phase modulation (in which the modulating signal may itself be sinusoidal), or sinusoids with phase noise (Lorentzian); the nature of the I and Q signals will depend, in part, on the amplitude and waveshape of the alternating electric signal that is applied to electrodes of the sample chamber. The I signal and the Q signals may have similar amplitude and frequency content. However, at any frequency there may be a relative phase shift between I and Q of substantially +90° or −90°, depending on the direction of the particles whose scattered light causes the light intensity beat signals. The two light intensity beat signals may be converted by photodetectors (not shown) into an electrical quadrature signal comprising an electrical in phase signal, I signal 118, and an electrical quadrature phase signal, Q signal 120. I signal 118 and Q signal 120 may be subjected to subsequent signal processing.

The quadrature interferometer 110 does not require the continuously moving optical parts of a conventional optical phase modulator or frequency shifter, and therefore may be characterized as having nominally stationary optics.

The electrophoresis sample chamber 112 may comprise a vessel that is capable of receiving and holding the sample particles to be characterized in a sample medium, and that is typically loadable to and removable from the sample holder 113 of quadrature interferometer 110. The vessel may be a windowed sample container, a sample plate, or sample tray. The mixture of the sample particles and the sample medium may constitute a colloid. The sample medium may be a liquid or fluid, a gel, or a gas. The electrophoresis sample chamber 112 may use electrodes to apply an electric field having known magnitude and direction to the sample medium and the particles or sample that is to be characterized. The particles, because of their electrostatic charges, may be compelled to move under the influence of the electric field. The electrophoresis sample chamber 112 may be inserted into and held by the sample holder 113 in such a way that particles in the sample fluid are illuminated by the interferometer's main beam 114. Main beam 114 light may be scattered and Doppler-shifted by the moving particles. The Doppler-shifted scattered light 116 may exit electrophoresis sample chamber 112 to be recombined with reference beam light in quadrature interferometer 110.

The sample holder 113 comprises a mechanical mount adapted to be loadable with the electrophoresis sample chamber 112, to hold the electrophoresis sample chamber 112 so that particles contained by electrophoresis sample chamber 112 may be illuminated by main beam 114, and to allow the scattered light 116 to be received by quadrature interferometer 110 and subsequently recombined with reference beam light. The particular design, shape, and dimensions of sample holder 113 may be adapted to the particular design, shape, and dimensions of the electrophoresis sample chamber 112 to be accommodated. Sample holder 113 may comprise, for example, a clasp, sheath, bracket, or cutout having a void with approximately the same cross-sectional shape and contours (for example, circular or rectangular) as the external surface of electrophoresis sample chamber 112. Sample holder 113 may further comprise springs or resilient stays to ease the loading and removal of electrophoresis sample chamber 112, and electrical contacts for providing stimulus to electrodes of electrophoresis sample chamber 112, for example (not shown).

Figure 1A:
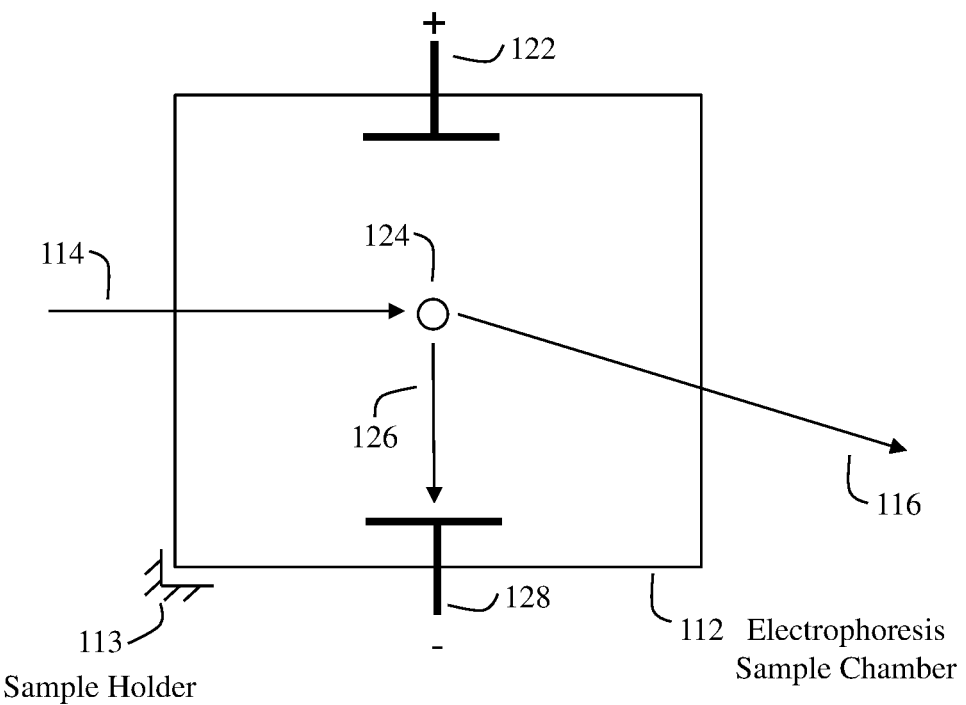
FIG. 1A shows a more detailed schematic diagram of an example of the electrophoresis sample chamber of FIG. 1.
Figure 1B:
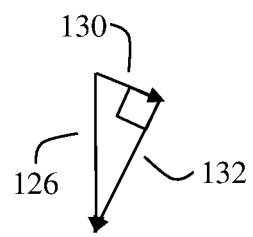
FIG. 1B shows a vector diagram.

FIGS. 1A and 1B illustrate in more detail the way a Doppler shift of the scattered light 116 may occur in the electrophoresis sample chamber 112. FIG. 1A shows a more detailed schematic diagram of an example of the electrophoresis sample chamber 112 of FIG. 1. The electrophoresis sample chamber 112 is held by sample holder 113 so that a particle 124 is illuminated by the main beam 114. The particle 124, when illuminated by the main beam 114, may produce scattered light in all directions, to some extent, including the direction of scattered light 116. The electrophoresis sample chamber 112 may include a positive electrode 112 and a negative electrode 128, for example, which may induce an electric field that compels a positively charged particle 124 to drift in the direction indicated by particle velocity vector 126, for example; a corresponding particle displacement vector (not shown), representing a displacement and direction of displacement that QPALS can aid in estimating, would typically be aligned with (parallel to) particle velocity vector 126.

FIG. 1B shows a vector diagram illustrating the projection of particle velocity vector 126 onto a line oriented at the same angle as that of scattered light 116. The resultant projection vector is a projection velocity component 130, which is the component of particle velocity vector 126 that is in the same direction as the scattered light 116. The projection velocity component 130 may cause a Doppler frequency shift in scattered light 116 (in contrast, the orthogonal rejection velocity component 132 may not contribute to Doppler shift in the direction of scattered light 116). In this example, since particle 124 effectively has a component of motion (projection velocity component 130) in the direction of the propagation of scattered light 116, the frequency of scattered light 116 may be increased slightly with respect to the light frequency of unscattered main beam 114, in proportion to the length of projection velocity component 130. In conventional LDV and LDE, these Doppler frequency shifts are typically measured using spectral analysis, and the frequency shifts are used to calculate speeds. However, in the present QPALS embodiments a phase shift is measured, corresponding to a particle displacement vector (not shown) that is parallel to projection velocity component 130.

It follows that the angle of the scattered light 116 beam used by quadrature interferometer 110 should preferably not be selected so that the scattered light 116 beam is orthogonal, or at 90°, to particle velocity vector 126, else electrophoretic particle drift may produce no Doppler shift or phase change in scattered light 116; it also follows that, for a given particle drift speed, the Doppler shift will increase as the angle between the scattered light 116 beam and particle velocity vector 126 decreases, with a theoretical maximum Doppler shift or phase change at a separation of 0°.

As was mentioned above, the mechanical and optical hardware and photodetectors of the quadrature optical interferometer of the embodiments is well known to those skilled in the art, as it was previously disclosed in the many embodiments of U.S. Pat. No. 11,181,503 B2, despite the fact that, in that prior art, a different sample cell electric field waveform and different signal processing (i.e., spectral analysis) was employed in order to accomplish conventional LDV and LDE.

The quadrature signal that quadrature interferometer 110 produces may be subsequently processed using QPALS signal processing, that will now be described.

Figure 2:
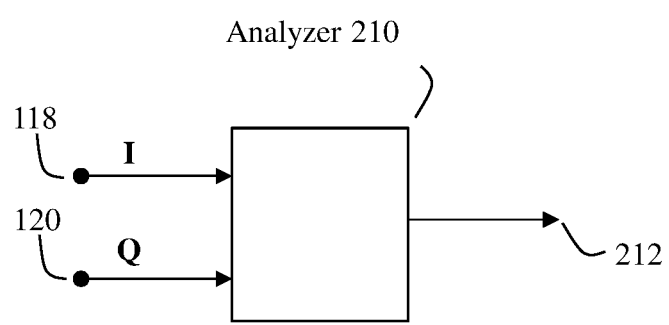
FIG. 2 shows a diagram of an analyzer that operates on the I, Q output signals from the interferometer of FIG. 1.

FIG. 2 shows an analyzer 210 that is connected to the outputs of quadrature interferometer 110, namely I signal 118, and Q signal 120. The analyzer operates on the I and Q signals to determine an estimate of a central value corresponding to the displacement of (charged) particles within the sample chamber that is caused by the electric field in the chamber, and couples the central value to output 212. The central value may be a mean value, an average value, an expected value, a median value, a root mean square value, or a peak value, for example. The direction of displacement may be determined by a sign of the central value.

Figure 3:
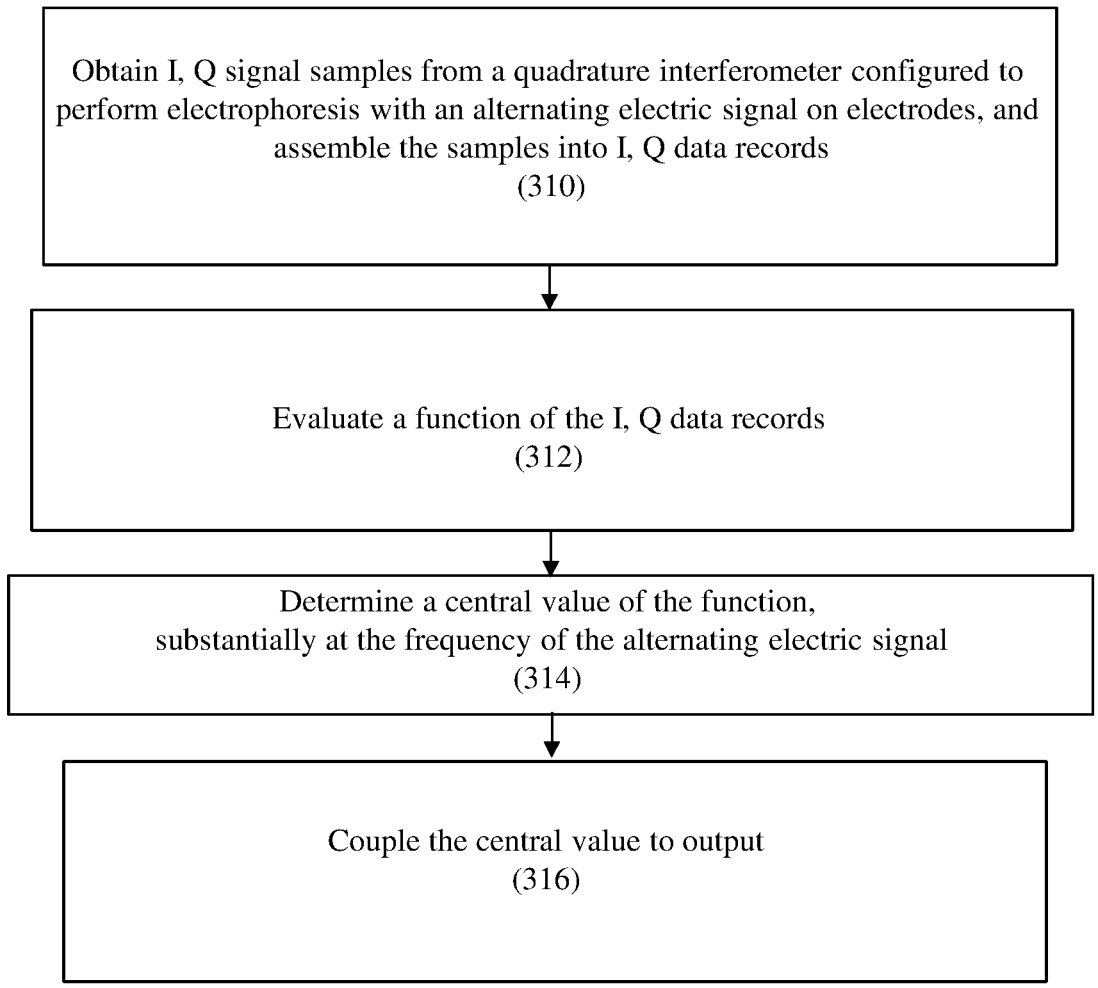
FIG. 3 shows a flow chart of operations that may be performed by the analyzer of FIG. 2.

FIG. 3 shows a flow chart that illustrates a non-limiting example of the signal processing means employed by analyzer 210. In input block 310, samples of I signal 118 and Q signal 120 are acquired from interferometer 110, whilst interferometer 110 performs electrophoresis with an alternating electric signal on its sample cell electrodes. Here, alternating means that the polarity or sign of the electric signal reverses periodically. The samples are assembled into I, Q data records. In function block 312, a function of the data records is determined. For example, the quadrature signal may be interpreted as a complex number signal, with I signal 118 being the real part, and Q signal 120 being the imaginary part. The function may comprise estimating a phase angle for each sample in the data record, for example, by calculating the arctangent of a ratio of a quadrature component to an in phase component for each sample in the data record, or arctan(Q/I). This function may be ambiguous for phase angles greater than $\pi$ radians, so, alternatively, in order to properly account for more than a half-cycle ($\pi$ radians) of phase change, the function may comprise estimating changes in phase angle between samples in the data record, and accumulating the changes in phase angle. In this case, oversampling of the quadrature signal may be necessary; for example, a sample rate twice that prescribed by Nyquist or Shannon, i.e., substantially four times the highest frequency component of the quadrature signal whose energy or power is above a threshold, may be employed. The threshold may be chosen to limit errors, such as sampling errors or aliasing, to an acceptable limit in any application. In value block 314, a central value of the function is determined, substantially at the frequency of the alternating electric signal that is applied to the sample chamber electrodes. For example, the signal processing means may comprise multiplying the function by a waveform having a period that is substantially equal to the period of the alternating electric signal applied to the electrodes 122, 128, thereby creating a product signal, and applying the product signal to a low pass filter. The multiplying may be performed for a substantially integral number of cycles of the alternating electric signal. The waveform may be substantially in phase synchronism with the alternating electric signal. The waveform may be phase shifted with respect to the phase of the alternating electric signal by substantially an integral multiple of 90 degrees. A phase shift of approximately 90 degrees may be useful, for example, because if the alternating electric signal is a sinusoid, the phase changes caused by the alternating electric signal will also be substantially sinusoidal, but will be phase shifted by about 90 degrees with respect to the alternating electric signal. In output block 316, the central value is coupled to output 212. Output 212 may comprise any number of conventional structures, such as a digital computer registers, busses, or networks, or analog signals and connections, as is discussed further below.

The direction of displacement may be determined by a sign of the central value, because the sign or polarity of the central value may correspond to the direction of motion and displacement of particles. Again, the direction of displacement of particles may be characterized as being either positive (+) or negative (−), corresponding to particle motion and displacement in substantially either the same or the opposite direction of the applied electric field, for example. For example, if the particles move in the same direction as the electric field, a certain phase shift polarity may be determined, but they move in the opposite direction, a phase shift with opposite polarity will be determined. These sign or polarity correspondences are exhibited in the MathCad simulation equation examples given below.

The central value and its sign or polarity may ultimately be used, in a conventional manner, to calculate an estimate electrophoretic mobility and zeta potential, and its sign or polarity.

The evaluating or determining of the central value in value block 314 may be performed for a quadrature signal record that corresponds to a plurality of cycles of the alternating electric signal applied to the electrodes 122, 128, in order to mitigate a random error in the central value. Furthermore, the evaluating or determining of the central value in value block 314 may be performed over a substantially integral number of periods of the alternating electric signal, which may mitigate both random and bias errors in the central value; in addition, this may mitigate quadrature signal offset or bias errors.

Certain errors and imbalances may be caused by non-ideal or un-matched optics, photodetectors, and electronics in the quadrature interferometer. Before the quadrature signal is processed in blocks 312, 314, it may be conditioned to remove offset error, phase imbalance, and amplitude imbalance, in conventional manners. Furthermore, an estimate of a substantially constant rate of change component of a phase of the quadrature signal may be made and used to compensate for a constant speed collective drift effect, to mitigate a bias error in the central value estimate.

The signal processing means of analyzer 210 may comprise a signal processor such as a phase sensitive detector, a synchronous detector, a synchronous rectifier, a lock in amplifier, a frequency analyzer, a spectrum analyzer, a cross correlator, a digital signal processor, and an analog signal processor. The waveform used to multiply the function may comprise a sinusoid, a complex sinusoid, a square wave, a triangle wave, and an arbitrary waveform; as noted above, the waveform may have a period that is substantially equal to the period of the alternating electric signal applied to the electrodes 122, 128. The low pass filter may comprise an integration, a summation, an average, a moving average, a digital filter, a digital infinite impulse response filter, a digital finite impulse response filter, and an analog filter.

Analyzer 210 may comprise any machine comprising any conventional combination of hardware and software able to perform the QPALS signal processing, an example of which is shown in FIG. 3. Hardware such as combinational logic and memory, a Field Programmable Logic Array (FPGA), a Digital Signal Processor (DSP), or an Application Specific Integrated Circuit (ASIC), may be used to implement analyzer 210, for example. Alternatively, a software program that implements QPALS signal processing, running on a computing device such as a DSP, an embedded microprocessor, a general-purpose computer, or a Personal Computer (PC), may be used, for example.

Various other configurations may also be used, with particular elements being implemented in software, firmware, or a combination thereof. One of ordinary skill in the art will recognize various alternatives to the specific embodiments described herein.

The various signal processing embodiments of analyzer 210 can be implemented in a wide variety of operating environments, which in some cases can include one or more user computers or computing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network.

Analyzer 210 embodiments can utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the internet, an intranet, an extranet, a public switched telephone network, an infrared network, a wireless network and any combination thereof.

In analyzer 210 embodiments utilizing a web server, the web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer-readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, a non-transitory computer readable storage medium, or any other medium which can be used to store the desired information and which can be accessed by a system device.

Based on the disclosure and teachings provided herein, a person of ordinary skill in the art will appreciate other ways and/or methods to implement the various embodiments.

What follows are several non-limiting examples of the mathematical operations that may be performed by analyzer 210 in the flowchart of FIG. 3. These operations were performed, verified, and tested in MathCad simulations; therefore, some of the syntax may be specific to MathCad. Most of the simulations shown here were discrete-time models with sampled data, but this does not preclude the implementation of the embodiments in analog or continuous-time or continuous-amplitude methods or devices.

First, if the function evaluated in function block 312 is phase, and if phase is estimated by arctan(Q/I) or atan2(I, Q) in a MathCad syntax, then a phase and differential phase dp may be represented as $$\text{phase}_i = \text{atan } 2(PA_i, PB_i)$$

$$dp_i = (\text{phase}_i - \text{phase}_{i-1})$$

where i is an index variable that corresponds to sample numbers, and PA, PB denote Photodetector A, Photodetector B signals, representing the I, Q components of a quadrature signal.

arctan(Q/I) is ambiguous if phase changes greater than +/−180°, or π radians, occur. This ambiguity can be eliminated, and phase changes greater than +/−180° can be properly accounted for, if the quadrature signal is sampled at high enough sample rate so that the quadrature signal vector, represented as an arrow on the complex number plane, never rotates further than to an adjacent quadrant from one sample to the next (in comparison to the well-known minimum sample rates prescribed by Nyquist or Shannon, this constitutes oversampling by a factor of two). Then, the change in phase delta_phase from one sample to the next may be determined in the following manner, depending on the quadrants that the vector moves between. The following four equations contain both numerical factors quantifying change in phase, as well as Boolean logic factors that either enable or zero the numerical factor, as appropriate.

$$\text{delta\_phase\_q12}_i := ((\text{phase}(i) \geq 0) \wedge (\text{phase}(i-1) \geq 0)) \cdot dp_i$$

$$\text{delta\_phase\_q34}_i := ((\text{phase}(i) < 0) \wedge (\text{phase}(i-1) < 0)) \cdot dp_i$$

$$\text{delta\_phase\_q23}_i := \left((\text{phase}(i) < 0) \wedge \left(\text{phase}(i-1) \geq \frac{\pi}{2}\right)\right) \cdot (2\pi + dp_i) - \left(\left(\text{phase}(i) \geq \frac{\pi}{2}\right) \wedge (\text{phase}(i-1) < 0)\right) \cdot (2\pi - dp_i)$$

$$\text{delta\_phase\_q14}_i :=$$

$$\left((\text{phase}(i) \geq 0) \wedge \left((\text{phase}(i-1) < 0) \wedge \left(\text{phase}(i-1) > \frac{-\pi}{2}\right)\right)\right) \cdot dp_i +$$

$$\left(\left((\text{phase}(i) < 0) \wedge \left(\text{phase}(i) > \frac{-\pi}{2}\right)\right) \wedge (\text{phase}(i-1) > 0)\right) \cdot dp_i$$

The accumulated or integrated phase function integ_phase can be arbitrarily initialized to 0, and thereafter, can be determined by accumulating the sum of the four above delta_phase's, as follows:

$$\text{integ\_phase}_0 := 0$$

$$\text{integ\_phase}_j := (\text{integ\_phase}_{j-1} + \text{delta\_phase\_q12}_j + \text{delta\_phase\_q34}_j + \text{delta\_phase\_q23}_j + \text{delta\_phase\_q14}_j)$$

where j is another index variable that corresponds to sample numbers.

An estimate of mean phase change due to electrophoresis can then be determined in value block 314 by multiplying integ_phase by a sinusoid that substantially has the frequency of the alternating electrical signal $f_e$, but is shifted in phase by 90° (in this example, the alternating electrical signal was assumed to be a cosine), summing the product over the number of samples in the record n, and normalizing by dividing by n:

$$\text{mean\_sinesquare\_electrophoresis\_phase\_change} := \frac{1}{n}\sum_{i=0}^{(n-1)} \text{integ\_phase}_i \cdot \sin(2\pi \cdot f_e \cdot \Delta t \cdot i)$$

where $\Delta t$ is the sample time, and i is an index variable that corresponds to sample numbers. This operation is similar to that performed by a lock in amplifier with the alternating electric signal of the sample cell electrodes connected to the reference input, with a phase shift of 90°, and with the integ_phase signal connected to a signal input.

This mean_sinesquare_electrophoresis_phase_change is an example of an estimate of a central value whose magnitude and sign can be used to help determine magnitude and polarity of electrophoretic mobility or zeta potential. As the variable name suggests, this is a measure of mean (synchronously rectified) phase change. This mean phase change can used to determine an estimate of displacement and direction of displacement of the particles, in a conventional manner, thereby aiding the determination of magnitude and polarity of electrophoretic mobility and zeta potential of the particles.

The direction of displacement may be determined by the sign of the mean phase change.

Other measures such as peak phase change and signed rms phase change, for example, may be determined by scaling appropriately within value block 314, as follows:

$$\text{peak\_electrophoresis\_phase\_change} := \frac{\text{mean\_sinesquare\_electrophoresis\_phase\_change}}{0.5}$$

$$\text{signed\_rms\_electrophoresis\_phase\_change} := \frac{\text{mean\_sinesquare\_electrophoresis\_phase\_change}}{0.707}$$

As before, the direction of displacement may be determined by the sign of the peak or signed rms phase change.

If an electrophoresis experiment is contaminated by a constant speed collective drift, perhaps due to thermal effects, for example, an estimate of the constant rate of change component of the phase of the quadrature signal may be made and used to compensate, as follows:

$$\text{ramp\_correction} := \frac{1}{n}\sum_{j=1}^{(n-1)} (\text{integ\_phase}_j - \text{integ\_phase}_{j-1})$$

$$\text{deramped\_integ\_phase}_j := \left(\text{integ\_phase}_j - \sum_{i=1}^{j}\text{ramp\_correction}\right)$$

ramp_correction is the average phase change due to collective drift from sample to sample, and deramped_integ_phase is the corrected variable that may be substituted for the previously used integ_phase and processed as before.

It should be noted that the selection of an adequate sample rate for obtaining I, Q samples in input block 310, cited in one example above as four times the highest significant frequency component of the quadrature signal, may be affected by at least three considerations. First, as mentioned above, any Brownian motion of the particles will broaden the spectrum of the quadrature signal. The extent of such broadening depends, in part, upon the distribution of particle size, and the viscosity of the fluid of the colloid. Second, the highest significant frequency component of the quadrature signal due to the collective motion of electrophoresis depends not only on the frequency of the alternating electric signal applied to the electrodes. It also depends upon the electrophoretic mobility of the particles and their collective speed, which, in turn, depend, in part, upon the viscosity and the dielectric constant of the fluid of the colloid, as well as the magnitude of the alternating electric signal. Higher particle speeds will result in greater displacements and phase changes per half cycle of the alternating electric signal, and, consequently, higher frequency components in the quadrature signal due to the collective motion of electrophoresis, which will require a higher sample rate. Finally, the alternating electric signal typically produces phase modulation of the quadrature signal, resulting in multiple harmonics of the alternating electric signal frequency in the quadrature signal spectrum.

As noted above, computer modeling and simulations of QPALS were performed using MathCad. Results of the simulations showed that the sensitivity of QPALS is comparable with the sensitivity of conventional PALS when measuring low electrophoretic mobility samples. For example, several simulations were done with a sinusoidal electric field frequency of 10.0 Hz, and a quadrature signal sample rate of 1.0 KHz. Phase change due to electrophoresis was simulated as a sinusoid having a phase shift of 90.0° with respect to the electric field.

With no noise or quadrature signal imbalance present, QPALS estimates of phase change were essentially error-free.

To test the effect of phase noise on estimates, in one test, a peak phase change due to electrophoresis of 3.6°=0.02π radians=0.063 radians (corresponding to a peak particle displacement that caused only 1/100 of a full interference cycle) was modeled and measured in the presence of a relatively large Lorentzian phase noise. The Signal-to-Noise Ratio (SNR) in the test was −34.6 dB, meaning that the phase noise power was about 2884.0 times the power of the phase change signal of interest (i.e., that was caused by the collective motion of electrophoresis). Under these conditions, of course, the sinusoidal phase change due to electrophoresis cannot be seen by simply inspecting the quadrature signal time record; the sinusoid is completely masked by the noise. However, the QPALS signal processing disclosed herein was able to detect the sinusoid and produce useful estimates of peak phase change. For an 80.0 second measurement time per trial, in 5 trials, estimates of peak phase change of +2.1°, +6.8°, +4.1°, +4.3°, +4.9° were determined; these should be compared to the ideal (model) value of 3.6°. This set of estimates has a mean value of +4.3°, and a sample standard deviation of 1.7°. Again, this shows that the sensitivity of QPALS is comparable with the sensitivity of conventional PALS when measuring low electrophoretic mobility samples.

QPALS was also shown to be resistant to quadrature imbalance. Regarding phase imbalance, in a first test, a 5.6° phase imbalance caused only a 0.17° error when measuring a peak phase change of 360.0°; in a second test, a 57.0° phase imbalance caused only a 7.4° error when measuring a peak phase change of 360.0°. Regarding amplitude imbalance, a +200.0% magnitude imbalance (i.e., the gain of the Q channel was 3.0 times the gain of the I channel) caused only an 11.5° error when measuring a peak phase change of 360.0°.

QPALS can have a sensitivity comparable to that of conventional PALS. QPALS allows the estimation of displacements corresponding to changes of less than a single cycle of interference, which may occur under conditions of low electrophoretic mobility or low electric fields. Therefore, particles having low electrophoretic mobility, or that might be adversely affected by high electric fields, can be analyzed, and constraints on vibration, light source coherence length, and electric field may be relaxed. The embodiments are resistant to errors caused by quadrature signal imbalance and quadrature signal offsets. Low frequency errors are mitigated by detection at the electric field frequency. Again, a phase modulator or frequency shifter is not required.

Many advantageous aspects accrue from the fact that the apparatuses of the present disclosure eliminate the use of a phase modulator or a frequency shifter, and have none of the extra electronic and mechanical support hardware typically associated with the use of a phase modulator or a frequency shifter.

The phase modulator or frequency shifter in a conventional interferometer may require the addition of many parts, including an optical part such as a mirror or reflector, a piezoelectric actuator, a precision displacement sensor, and associated position sensing, drive and control electronics. These additional parts may make the instrument larger, heavier, more fragile, and less reliable than is desired in certain applications. The additional parts may routinely require additional time and effort for calibration thereby adding to manufacturing costs and lead time.

Furthermore, the apparatuses of the present disclosure are not subject to any added scaling errors, bias errors, random errors, linearity errors, or any other errors that might be associated with the phase modulators and frequency shifters of conventional instruments.

In conventional instruments, to the extent that an additional optical phase modulator or frequency shifter part unbalances the optical path length matching between the measurement or main arm and the reference arm, a longer coherence length may be required for the interferometer light source. In conventional instruments, in which the optical path length of one arm changes during operation, the coherence length must be, at least, greater than the maximum optical path length change. As discussed above, the coherence length of the light must be at least equal to any optical path length difference between the main and reference beam optical paths. Optical path length imbalances that are unchanging can be compensated for by adding fixed compensating optical elements to lengthen a short optical path in one arm; however, a phase modulator or frequency shifter may continuously vary an optical path in one arm length during operation. If a reflector, for instance, moves 200 μm (μm=micrometers), the path length may effectively change by 400 μm (that is, the path length change may be doubled due to the round-trip path of light). This exceeds the coherence length of many simple laser diodes, and may necessitate the use of an external-cavity diode laser configuration to obtain a suitably larger coherence length, which may further increase the size, weight, complexity, and cost of an instrument.

In comparison, since the apparatuses of the present disclosure do not use a phase modulator or frequency shifter, the matching between the optical path lengths of the main beam and reference beam arms nominally tends to be better than that of conventional devices. Furthermore, the optical path lengths of the apparatuses of the present disclosure are nominally fixed—they do not vary during operation. Any fixed path length differences may be reduced by inserting compensating optical elements (not shown). Consequently, apparatuses of the present disclosure may be able to employ a light source having a shorter coherence length, and a wider variety of light sources, some having lower size, weight, complexity, and cost, may be used for the light source.

Consequently, the apparatuses of the present disclosure may be smaller, lighter, more durable, more reliable, and less susceptible to vibration than conventional instruments. The apparatuses of the present disclosure may also be less expensive than conventional instruments, due to the elimination of phase modulator or frequency shifter optical hardware and associated electronic hardware, and due to relaxed coherence length constraints on light sources, while still providing an unambiguous determination of the sign of electrophoretic mobility and zeta potential.

Quadrature interferometer 110 may be implemented with various optical hardware designs that are different in detail, but that are substantially similar in function.

Although the description above contains many specificities, these should not be construed as limiting the scope of the embodiments but as merely providing illustrations of some of aspects of the present disclosure. For example, the optical quadrature interferometer 110 described herein, and the optical quadrature interferometers of the cited prior art of U.S. Pat. No. 11,181,503 B2, for example, may be implemented with various optical hardware designs that are different in detail, but that are substantially similar in function. Based upon the principles illustrated by the disclosed aspects, other arrangements and types of optical components, including different configurations of polarizers, polarizing beam splitters, and free-space or fiber optic components, and apertures, lenses, and mirrors, for instance, may be used to construct a optical quadrature interferometer 110 that is usable with an electrophoresis sample chamber 112.

The present disclosure generally illustrates the use of one I, Q quadrature signal, but aspects of the present disclosure may be also used with multiple sets of independent quadrature signals collected at the same or different scattering angles, as is done in conventional Massively-Parallel Phase Analysis Light Scattering (MP-PALS), for example. This could be dubbed Massively-Parallel Quadrature Phase Analysis Light Scattering (MP-QPALS).

Some descriptions provided herein of example embodiments reference sampled-data aspects, such as discrete-time and discrete-amplitude sampling. These were provided as examples, but do not preclude the implementation of the embodiments in analog or continuous-time or continuous-amplitude methods or devices.

Although the description above contains many specificities, these should not be construed as limiting the scope of the embodiments but as merely providing illustrations of some of several embodiments.

Thus, the scope of the embodiments should be determined by the appended claims and their legal equivalents, rather than by the examples given.

The invention claimed is:

1. A device for measuring displacement and direction of displacement of particles undergoing electrophoresis in an electrophoresis sample chamber, comprising:

an optical quadrature interferometer having an electrophoresis sample chamber, the electrophoresis sample chamber and the particles being positioned in a path of a main beam to produce a scattered light, the optical quadrature interferometer being configured to perform quadrature phase analysis light scattering on the particles by using the scattered light to generate a quadrature signal comprising characteristics related to the displacement and direction of displacement of the particles, the particles being urged by an alternating electric signal applied to electrodes of the sample chamber, and an analyzer comprising signal processing means for acquiring a data record of the quadrature signal, evaluating a function of the data record, and determining a central value of the function substantially at the frequency of the alternating electric signal, whereby the central value is used to determine a displacement and a direction of displacement of the particles, thereby aiding the determination of magnitude and polarity of electrophoretic mobility and zeta potential of the particles.

2. The device of claim 1, wherein the central value is selected from the group consisting of a mean value, an average value, an expected value, a median value, a root mean square value, and a peak value.

3. The device of claim 1, wherein the direction of displacement is determined by a sign of the central value.

4. The device of claim 1, wherein the determining is performed over a plurality of cycles of the alternating electric signal, whereby a random error in the central value is mitigated.

5. The device of claim 1, wherein the determining is performed over a substantially integral number of periods of the alternating electric signal, whereby random and bias errors in the central value are mitigated.

6. The device of claim 1, wherein the evaluating a function comprises estimating a phase angle for each sample in the data record.

7. The device of claim 6, wherein the estimating comprises determining an arctangent of a ratio of a quadrature component to an in phase component for each sample in the data record.

8. The device of claim 1, wherein the evaluating a function comprises estimating changes in phase angle between samples in the data record, and accumulating the changes in phase angle.

9. The device of claim 8, wherein the acquiring comprises oversampling.

10. The device of claim 1, wherein an estimate of a substantially constant rate of change component of a phase of the quadrature signal is made and used to compensate for a constant speed collective drift effect, whereby a bias error in the central value is mitigated.

11. The device of claim 1, wherein the signal processing means comprises a signal processor selected from the group consisting of a phase sensitive detector, a synchronous detector, a synchronous rectifier, a lock in amplifier, a frequency analyzer, a spectrum analyzer, a cross correlator, a digital signal processor, and an analog signal processor.

12. The device of claim 1, wherein the quadrature signal is conditioned to remove an error selected from the group consisting of offset error, phase imbalance, and amplitude imbalance.

13. The device of claim 1, wherein the determining comprises multiplying the function by a waveform having a period that is substantially equal to the period of the alternating electric signal, thereby creating a product signal, and applying the product signal to a low pass filter.

14. The device of claim 13, wherein the multiplying is performed for a substantially integral number of cycles of the alternating electric signal.

15. The device of claim 13, wherein the waveform is substantially in phase synchronism with the alternating electric signal.

16. The device of claim 15, wherein the waveform is phase shifted with respect to a phase of the alternating electric signal by substantially an integral multiple of 90 degrees.

17. The device of claim 13, wherein the waveform is selected from the group consisting of a sinusoid, a complex sinusoid, a square wave, a triangle wave, and an arbitrary waveform.

18. The device of claim 13, wherein the low pass filter is selected from the group consisting of an integration, a summation, an average, a moving average, a digital filter, a digital infinite impulse response filter, a digital finite impulse response filter, and an analog filter.

* * * * *